UNITED STATES PATENT OFFICE.

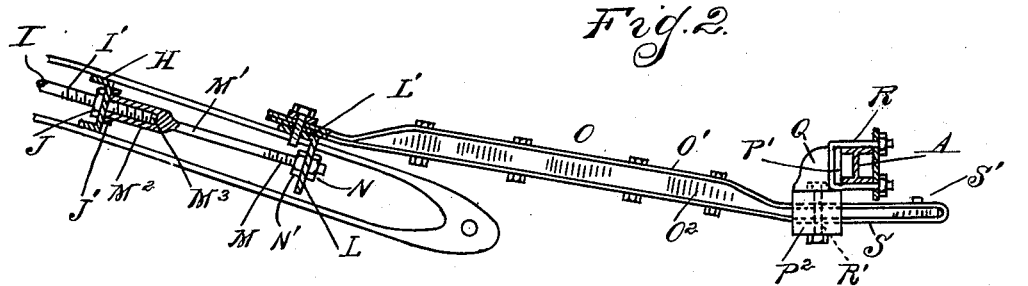
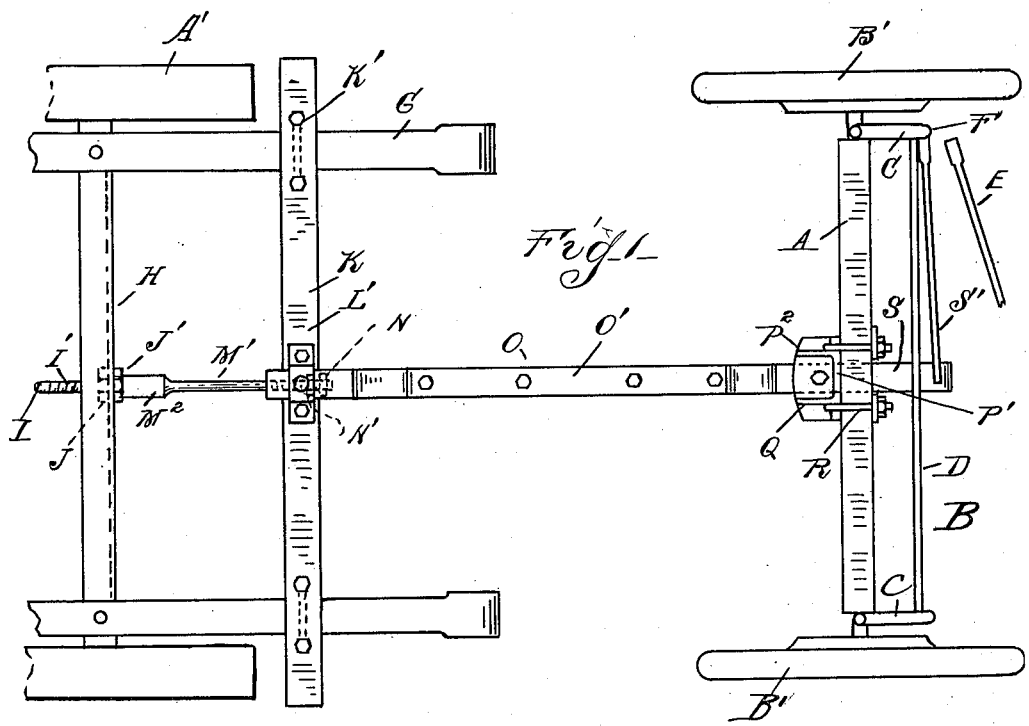
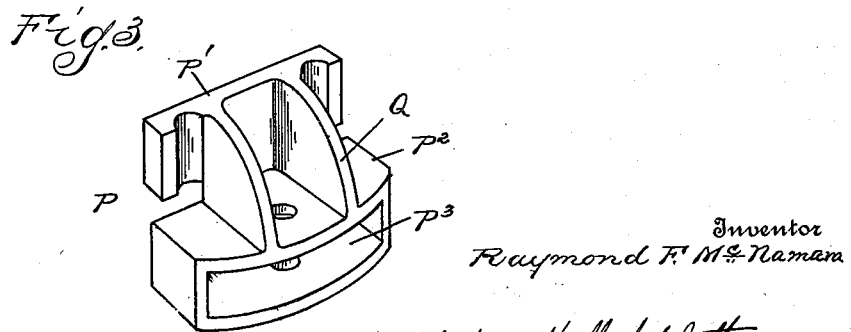

RAYMOND F. McNAMARA, OF DETROIT, MICHIGAN, ASSIGNOR TO MAXWELL MOTOR COMPANY, INC., OF DETROIT, MICHIGAN, A CORPORATION OF DELAWARE.

TOWING CONNECTION FOR VEHICLES.

1,342,507. Specification of Letters Patent. Patented June 8, 1920.

Application filed May 13, 1918. Serial No. 234,079.

*To all whom it may concern:*

Be it known that I, RAYMOND F. Mc-NAMARA, a citizen of the United States of America, residing at Detroit, in the county of Wayne, and State of Michigan, have invented certain new and useful Improvements in Towing Connections for Vehicles, of which the following is a specification, reference being had therein to the accompanying drawings.

The invention relates to a towing connection for vehicles and the object of the invention is to obtain a simple construction which is readily attachable to and detachable from the towing and towed vehicles and when attached, will tow and steer the latter from the former. Another object of the invention is to obtain a construction in which the front axle only of the towed vehicle is subjected to the towing strains and in which a substitute drag link effects the steering. A further object of the invention is to obtain a construction in which the draw-bar of the towing connection is connected to a cross bar which is secured both to the side he frame of the towing vehicle and to the rear cross bar of the frame. A still further object of the invention is to obtain a construction in which the towing connection forms a protection for the fenders of the vehicles. Other objects of the invention reside in the novel arrangements and combinations of parts as more fully hereinafter set forth.

In the drawings:

Figure 1 is a top plan view of the towing connection as applied to both the towing and towed vehicles;

Fig. 2 is a sectional side elevation;

Fig. 3 is a perspective view of the coupler member.

A is the front axle of the towed vehicle, B and B' are the ground wheels pivotally mounted upon the front axle, C C are the steering arms connected to the ground wheels, and D the tie-rod extending between the steering arms for correspondingly operating the same. When the vehicle is moving under its own power, the drag-link E is connected at F to the tie-rod D to steer the vehicle through the steering arms C.

The frame of the towing vehicle comprises the side sills G connected by the rear cross bar H and other cross bars (not shown).

Extending between the cross bars and longitudinally centrally of the frame is the brace-rod I having the threaded end I' extending through the rear cross bar H and when the vehicle is not being used to tow another vehicle, the threaded end I' is engaged by the nuts J and J' upon opposite sides of the rear cross bar.

The towing connection for the vehicles has the following construction: K is an attachable cross bar extending between the side sills G and secured thereto by the detachable clips K', the ends of the cross bar extending outward slightly beyond the outer sides of the fenders A' upon the vehicle to protect the same. This cross bar has the depending flange L between the side sills G through the middle of which extends the threaded end M of the brace-rod M', which brace-rod is in alinement with the brace-rod I and has the end $M^2$ with the threaded bore $M^3$ for engagement with the threaded end I' of the brace-rod I. The end $M^2$ abuts against the rear cross bar H and the threaded end M is engaged by the nuts N and N' upon opposite sides of the depending flange L of the attachable cross-bar K. Pivotally secured to the lateral flange L' of the attachable cross bar and centrally thereof is the draw-bar O which comprises the one-piece metallic strip O' forming the top and bottom of the draw-bar and the wooden insert $O^2$. This draw-bar is pivotally secured to the front axle A of the towed vehicle by means of the coupler member P, which is provided with the upwardly extending flange P' and with the transverse portion $P^2$ having the passage-way $P^3$ therethrough for the draw-bar O. The upwardly extending flange P' is reinforced by means of the spaced segmental reinforcing flanges Q extending between the flange P' and the transverse portion $P^2$. Clips R detachably engaging the outer ends of the upwardly extending flange P' and front axle secure the coupler member to the axle. The passage-way $P^3$ is of a size to permit of limited universal movement of the draw-bar O relative thereto and the draw-bar is secured to the coupler member by means of the pivot bolt R'. The draw-bar is provided with the rearward extension S to which is pivotally secured the substitute drag-link S', the opposite end of the substitute drag-link being connected to the tie-rod D at F in place of the usual drag-link E.

In use, the towing connection can be readily applied and when applied, the towing stress is placed upon the front axle of the towed vehicle and the ground wheels of the towed vehicle are properly actuated by means of the extension S upon the draw-bar O and the substitute drag-link S' acting through the tie-rod D and steering arms C. The point of attachment to the draw-bar O and of the frame of the towing vehicle is greatly reinforced and furthermore the towing connection forms a protection for the fenders of the towing vehicle.

What I claim as my invention, is:

1. In a towing connection for vehicles, the combination with a draw-bar, of a coupler member having a portion adapted for attachment to the front axle of the towed vehicle, and a portion with a passage-way therethrough for said draw-bar, said passage-way providing clearance for limited universal movement of said draw-bar relative thereto, and means for pivotally connecting said draw-bar to said coupler member.

2. In a towing connection for vehicles, the combination with a draw-bar, of a coupler member having an upwardly extending flange portion adapted for attachment to the front axle of the towed vehicle, and a transverse portion with a passage-way therethrough for said draw-bar, said passage-way providing clearance for limited universal movement of said draw-bar relative thereto, clips for securing said flanged portion to said front axle, and a pivot extending through said transverse portion for connecting said draw-bar to said coupler member.

3. The combination with the frame of the towing vehicle, including the side sills, a rear cross bar between said side sills, and a central longitudinally extending brace-rod having a threaded end extending through said rear cross bar, and fenders on opposite sides of said frame, of an attachable cross bar secured to said side sills and extending outwardly beyond the fenders of the towing vehicle, a draw-bar pivotally secured to the central portion of said attachable cross bar, a rod threadedly engaging said threaded end of the brace-rod and abutting against said rear cross bar, the opposite end of said rod extending through said attachable cross bar, and nuts upon said opposite end and engaging opposite sides of said attachable cross bar.

4. The combination with the frame of the towing vehicle, including the side sills, a rear cross bar between said side sills and a central longitudinally extending brace rod having a threaded end extending through said rear cross bar, of an attachable cross bar secured to said side sills, a draw-bar pivotally secured to the central portion of said attachable cross bar, a rod threadedly engaging said threaded end of the brace rod and abutting against said rear cross bar, the opposite end of said rod extending through the opposite end of said cross bar, and nuts upon said opposite end and engaging opposite sides of said attachable cross bar.

In testimony whereof I affix my signature.

RAYMOND F. McNAMARA.